United States Patent
Hawkins et al.

(10) Patent No.: US 11,182,796 B2
(45) Date of Patent: Nov. 23, 2021

(54) ANOMALY DETECTION METHOD FOR FINANCIAL TRANSACTIONS

(71) Applicant: MASTERCARD INTERNATIONAL INCORPORATED, Purchase, NY (US)

(72) Inventors: Tammy Lynn Hawkins, Dublin (IE); Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/601,212

(22) Filed: Oct. 14, 2019

(65) Prior Publication Data

US 2020/0151729 A1     May 14, 2020

(30) Foreign Application Priority Data

Nov. 9, 2018   (EP) .................................... 18205520

(51) Int. Cl.
   *G06Q 20/40*     (2012.01)
   *G06Q 20/10*     (2012.01)
(52) U.S. Cl.
   CPC ....... *G06Q 20/4016* (2013.01); *G06Q 20/102* (2013.01)
(58) Field of Classification Search
   None
   See application file for complete search history.

(56) References Cited

U.S. PATENT DOCUMENTS

| | | |
|---|---|---|
| 2005/0039036 A1 | 2/2005 | Eisen |
| 2009/0089869 A1 | 4/2009 | Varghese |
| 2011/0196791 A1 | 8/2011 | Dominguez |
| 2011/0258118 A1 | 10/2011 | Ciurea |
| 2012/0158586 A1 | 6/2012 | Ganti et al. |
| 2015/0242840 A1 | 8/2015 | Kursun |
| 2018/0005230 A1 | 1/2018 | Zovi et al. |
| 2019/0066111 A1* | 2/2019 | Bizarro .............. G06Q 20/4016 |
| 2019/0114639 A1* | 4/2019 | Nick ..................... G06F 16/285 |
| 2019/0385170 A1* | 12/2019 | Arrabothu .............. G06N 7/005 |
| 2020/0097579 A1* | 3/2020 | Manjappa ........... G06F 16/2379 |

OTHER PUBLICATIONS

Segal, S. Y. (2016). Accounting frauds—review of advanced technologies to detect and prevent frauds 1. Economics and Business Review, 2(4), 45-64. doi:http://dx.doi.org/10.18559/ebr.2016.4.3 on Jul. 16, 2021 (Year: 2016).*

(Continued)

*Primary Examiner* — Kito R Robinson
(74) *Attorney, Agent, or Firm* — Jordan IP Law, LLC (57) ABSTRACT

An method to detect anomalies in financial transactions which may be used to assess a risk of fraud is provided. The method comprises providing a computer-implemented approval log which stores a primary account number and one or more transaction attributes from a plurality of approved financial transactions associated with the primary account number. A computer-implemented approval anomaly detector is also provided to assess the plurality of approval events. These anomalies are then made available to one or more parties associated with the payment interchange network.

20 Claims, 3 Drawing Sheets

(56) References Cited

OTHER PUBLICATIONS

Ryman-Tubb, N. (2016). Understanding payment card fraud through knowledge extraction from neural networks using large-scale datasets (Order No. 10301416) . . . (Year: 2016) Available from ProQuest Dissertations and Theses Professional. (1858965489). Retrieved from https://dialog.proquest.com/professional/docview/1858965489?accountid=131444 on Jul. 16, 2021 (Year: 2016).*

Extended European Search Report for European Patent Application No. 18205520.2, dated Mar. 1, 2019, 8 pages.

International Search Report and Written Opinion for International Patent Application No. PCT/US2019/052127, dated Jan. 3, 2020, 13 pages.

Office Action for European Patent Application No. 18205520.2, dated Mar. 12, 2021, 7 pages.

* cited by examiner

ANOMALY DETECTION METHOD FOR FINANCIAL TRANSACTIONS

CROSS-REFERENCE TO RELATED APPLICATIONS

The present application claims priority to European Patent Application No. 18205520.2 (filed on Nov. 9, 2018), which is hereby incorporated by reference in its entirety.

FIELD

The present disclosure relates to a computer-implemented anomaly detection method for financial transactions.

BACKGROUND

Financial transactions typically use an exchange of messages between parties associated with a payment interchange network, such as a Merchant, an Acquirer, and an Issuer—these are members of a four-party interchange model. The network messages may include requests, authorizations, advices, reversals, account status inquiry, presentments, purchase returns and chargebacks. Additionally, such financial network messages include attributes such as, but, not limited to a Primary Account Number (PAN) that can be either real or virtual, a transaction amount, a Merchant identification, an Acquirer identification (which in combination with the Merchant identification uniquely identifies a Merchant), transaction date-time, address verification information, and a transaction reference number.

Fraudulent transactions are a major problem with payment interchange networks—one approach is to assign liability under certain circumstances. For example, in certain transaction scenarios, the relevant Issuer is liable for fraud. In others, it is the relevant Merchant—for example, if a Card Not Present (CNP) transaction is initiated without 3DS (3D Secure) verification. In some cases, liability may not be clear-cut, leading to disputes among the parties about who should compensate the other parties. In addition, some frauds are only detected after approval or authorization, making it more complicated to resolve any dispute.

It is an object of the invention to provide an improved method to detect anomalies in financial transactions which may be used to assess a risk of fraud.

GENERAL STATEMENTS

According to a first aspect of the present disclosure, there is provided a computer-implemented method for anomaly detection in financial transactions performed over a payment interchange network associated with one or more parties, the method comprising: providing a computer-implemented approval log in communication with the payment interchange network; receiving at the approval log from the payment interchange network: a primary account number; one or more transaction attributes from a plurality of approved financial transactions associated with the primary account number; storing the one or more transaction attributes as a plurality of approval events associated with the primary account number at the approval log; providing a computer-implemented approval anomaly detector in communication with the approval log; retrieving by the approval anomaly detector a plurality of approval events for one or more stored transaction attributes; assessing the plurality of approval events for the presence of one or more anomalies; and providing the one or more anomalies to one or more parties associated with the payment interchange network.

By logging attributes associated with approved (authorized) financial transactions, a useful resource is provided to detect anomalies in these financial transactions, which may result in a higher degree of fraud protection and may assist in the settlement of disputes. Additionally, the use of incorrect, outdated or malfunctioning security systems and protocols may be detected.

According to a further aspect of the current disclosure, the method further comprises assessing a risk of fraud during a further financial transaction associated with the primary account number based on the presence of one or more anomalies; and providing the risk of fraud to one or more parties associated with the payment interchange network.

Advantageously, any anomalies detected may be further analysed to assess a risk of fraud. This may be performed centrally and/or each party may perform their own analysis, which provides a very flexible method.

According to another aspect of the current disclosure, the method further comprises assessing the plurality of approval events for the presence of one or more anomalies is performed immediately before approval of a further financial transaction; and/or assessing the risk of fraud is performed immediately before approval of the further financial transaction.

The method may be further extended to provide a real-time (or almost real-time) check to be used during the approval or authorization process. If particular anomalies are detected and/or a risk of fraud is considered too high, the party responsible for approving the transaction may decline it, partially approve it or approve it conditionally.

According to a still further aspect of the current disclosure, the anomaly detector is further in communication with payment interchange network.

The anomaly detector may operate independently, analyzing the contents of the approval log. It may be advantageous to provide a direct communication with the interchange network to allow the anomaly detector to directly communicate with one or more parties associated with the network. The anomaly detector may send and receive messages directly with the one or more parties to further improve the degree of fraud protection. Additionally or alternatively, the results from the anomaly detector may also be shared more easily among the parties.

According to yet another aspect of the current disclosure, the one or more parties comprises one or more of the following: an Issuer, a Merchant, an Acquirer, a Consumer, a network provider; and the primary account number and/or one or more transaction attributes are received from one or more of the following: the Issuer, the Merchant, the Acquirer, the Consumer, the network provider.

The methods in this disclosure may be applied to any form of payment interchange network. However, it is particularly suitable for a network operating with the Four-Party Model, in which the parties include an Issuer, a Merchant (as Card Acceptor), a Consumer (or Cardholder) and an Acquirer. In addition, it may be advantageous to provide the approval log with access to the largest number and variety of transaction attributes by arranging the receipt of these attributes from the parties directly. For example, some communications and interchange messages between two parties may not be available to other parties, or the other parties may not be able to fully decode the contents of some messages not addressed to them.

According to another aspect of the current disclosure, the one or more parties comprises one or more Issuers who approve the plurality of financial transactions; and/or the one or more parties comprises one or more Merchants who approve the plurality of financial transactions.

The methods in this disclosure may be applied to any form of payment interchange network where approval or authorization is given by one or more of the parties. However, it is particularly suitable for a network in which one or more Issuers and/or one or more Merchants approve the financial transactions.

According to a further aspect of the current disclosure, the one or more parties comprises one or more of the following: an Issuer, a Merchant, an Acquirer, a Consumer, a network provider; and the one or more anomalies are provided to the one or more of the following: the Issuer, the Merchant, the Acquirer, the Consumer, the network provider.

The methods in this disclosure may be applied to any form of payment interchange network. However, it is particularly suitable for a network operating with the Four-Party Model, in which the parties include an Issuer, a Merchant (as Card Acceptor), a Consumer (or Cardholder) and an Acquirer. In addition, it may be advantageous to provide the anomalies detected to one or more of the parties so that they can improve their own procedures, protocols and systems themselves.

According to another aspect of the current disclosure, the one or more transaction attributes comprise an attribute more closely linked to the primary account number than to the approved financial transaction.

One of the insights of the invention is to detect anomalies in the attributes associated with approved transactions by looking for unexpected variations. Some of the attributes are more closely linked to the PAN number than to the transaction—in other words, the attribute is expected to be constant (or substantially constant) for more than one transaction. This disclosure provides some non-limiting examples of attributes with this expectation.

According to still another aspect of the current disclosure, the one or more transaction attributes comprise an attribute more closely linked to the approved financial transaction than to the primary account number.

One of the insights of the invention is to detect anomalies in the attributes associated with approved transactions by looking for unexpected variations. Some of the attributes are more closely linked to the transaction than to the PAN number—in other words, the attribute is expected to vary between transactions. This disclosure provides some non-limiting examples of attributes with this expectation.

According to another aspect of the current disclosure, the method further comprises: providing a further computer-implemented approval log in communication with the payment interchange network; and providing a further computer-implemented approval anomaly detector in communication with the further approval log.

Some communications and interchange messages between two parties may not be available to other parties, or the other parties may not be able to fully decode the contents of some messages not addressed to them. It may therefore be advantageous for more than one approval log and anomaly detector. For example, each log/detector may be provided, operated and maintained by different parties, allowing them to assist in the fraud detection without having to share details about how to decode messages addressed to them. In other words, processed data may be shared instead of raw data.

According to a still further aspect of the current disclosure, the method further comprises: receiving from the payment interchange network one or more interchange messages associated with each approved financial transaction; selecting the one or more transaction attributes from the one or more interchange messages; and providing the one or more transaction attributes to the approval log.

Although each party associated with the interchange network may provide attributes directly, it may be advantageous to actively monitor interchange messages associated with the approved financial transactions and select the attributes directly. As these are usually at least partially standardized, this may be implemented into the protocols of the interchange network.

Examples of such standards currently in use include ISO 8583 standards, EMV standards and protocols, and 3D Secure (3DS) standards and protocols.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In the following detailed description, numerous non-limiting specific details are given to assist in understanding this disclosure. It will be obvious to a person skilled in the art that the method may be implemented on any type of standalone system or client-server compatible system containing any type of client, network, server, and database elements. Storage may be performed using any suitably-configurable computer memory.

Figure 1:
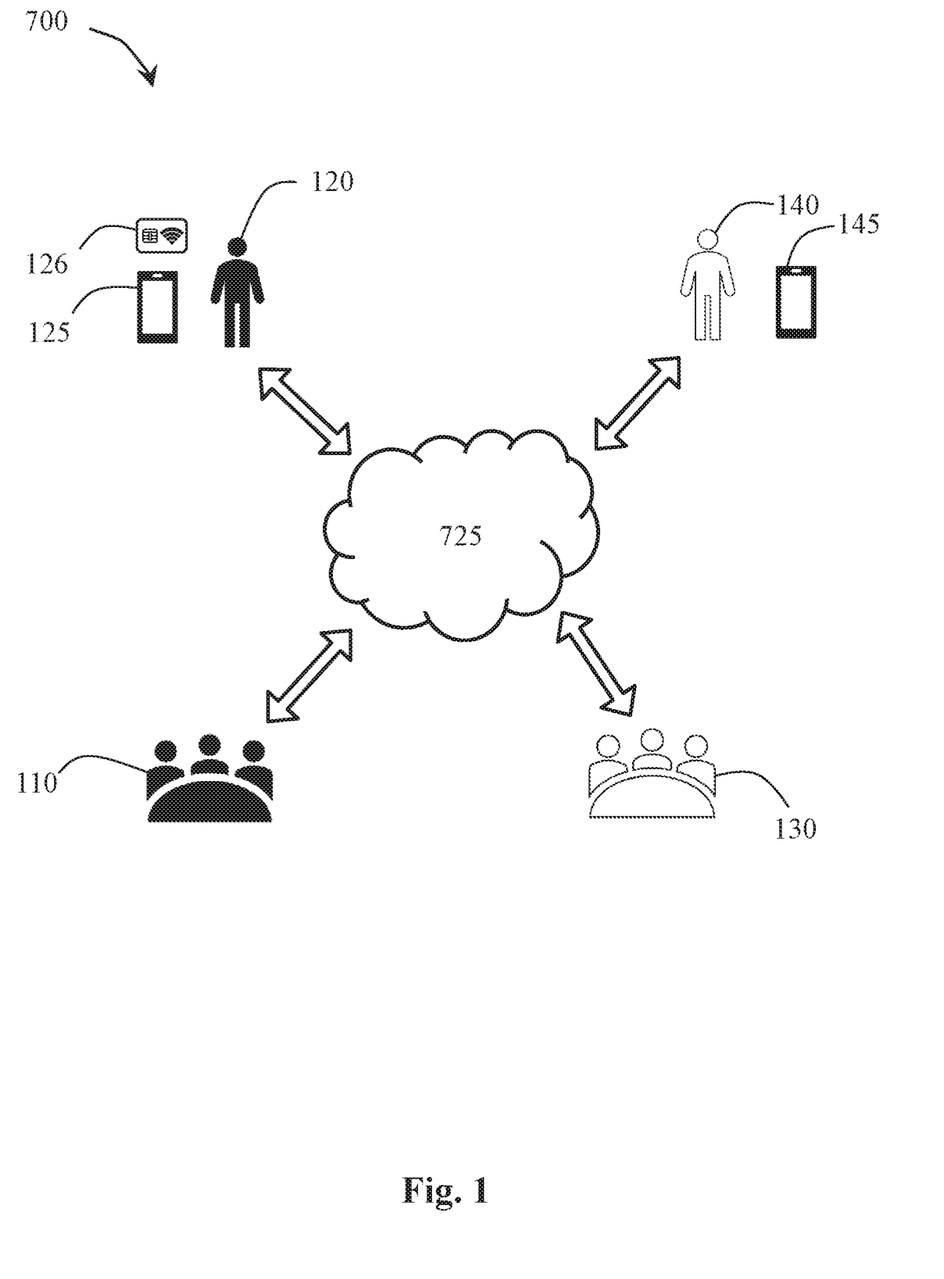
FIG. 1 depicts a conventional payment interchange network, associated with one or more parties.

FIG. 1 depicts a conventional payment interchange network 725, associated with one or more parties—for a financial transaction, the parties comprise at least a Merchant 140 (or Retailer) and a Consumer 120 (or Purchaser). The Merchant 140 is assumed to also be the Card Acceptor, who accepts the card and presents the transaction data to an Acquirer 130. Traditionally, the Consumer 120 is also called a Cardholder as in the past the Consumer would carry a payment card 126 (or transaction card). Increasingly, payments are initiated using mobile devices 125, such as a mobile phone or laptop, which comprises a software representation of the payment card 126 and/or payment account information. References made herein to (payment) card comprise physical cards, virtual cards and software representations of a card. Increasingly, Merchants 140 are also using mobile device 145, such as mobile phones or laptops, which comprise a representation of a POS (Point of Sale) device and/or a virtual "check-out" application and/or payment account information.

This example depicts the four-party model, where the payment interchange network 725 is also associated with an Acquirer 130 and an Issuer 110, such as a bank. This allows one or more conventional multi-party financial transaction methods 700 to be performed, such as credit card payments. The conventional payment interchange network 725 is usually governed by payment-system specific communications standards for the exchange of financial transaction data and the settlement of funds between financial institutions that are members.

Typically, the Issuer is a financial institution that issues a transaction card 126, such as a credit card or payment card, to the Consumer 120 (or Cardholder) who uses the transaction card 126 to tender payment for a purchase from the Merchant 140.

To accept payment with the transaction card 126, the Merchant 140 must normally establish an account with a financial institution that is part of the payment interchange network 725. This financial institution is usually called the "merchant bank," the "acquiring bank," or the Acquirer 130. When the Cardholder 120 tenders payment for a purchase with a transaction card 126, the Card Acceptor (here the Merchant 140) requests authorization from the Acquirer 130 for the amount of the purchase. It is the Acquirer 130 that acquires the data relating to a transaction from the Card Acceptor (the Merchant 140). It is the Acquirer 130 that initiates that data into the payment interchange network 725.

Alternatively, the Acquirer 130 may authorize a third party to perform transaction processing on its behalf. Such a third party is usually called a "merchant processor," an "acquiring processor," or a "third party processor."

Initiating and completing financial transactions require the exchange of electronic messages relating to the financial transactions over the payment interchange network 725. In addition, the ability to offer related services requires the exchange of further electronic messages between the associated parties.

These messages are at least partially standardized and formalised—these standard specifications and protocols are managed by relevant bodies like, for example:

EMVCo LLC (EMV), who make them available at www.emvco.com; and

ISO, who make them available at www.iso.org

For example, ISO 8583 "Financial transaction card originated messages—Interchange message specifications" specifies an interface enabling messages to be exchanged between computer systems connected to the interchange network 725. However, designers of software applications implementing such financial services and transactions through the interchange network 725 have a very large degree of freedom to design within the overall constraint that messages should be convertible to this interface format. in order that international interchange may take place. Typically, the details of the data representation used in the electronic messages is subject to the commercial relationships between the parties associated with the payment interchange network 725.

For example, 3DS (3-D Secure) is a protocol which provides an additional security layer for support app-based authentication and integration with digital wallets, as well as traditional browser-based e-commerce transactions. It is managed by the EMV, and the latest version if found at: www.emvco.com/emv-technologies/3d-secure/

Using the network 725, computers of the Acquirer 130 will communicate with computers of the Issuer 110 to determine whether the Cardholder's 120 account is in good standing and whether the purchase is covered by Cardholder's 120 available credit line. Based on these determinations, the request for authorization will be declined or accepted. If the request is accepted, an authorization code is issued to the Merchant 140.

When a request for authorization is accepted, the available credit line of Cardholder's 120 account is decreased and a charge to the account may be posted at the time of the transaction.

Typically, the transaction card 126 information, such as a type of merchant, amount of purchase, date of purchase, is stored in a computer-implemented database, either at a convenient storage location in the payment interchange network 725 and/or at the Issuer 110. Fraud detection is limited in many cases to checking that the transaction card 126 information is correct and consistent.

After a purchase has been made, a clearing process occurs to transfer additional transaction data related to the purchase among the parties to the transaction, such as the Acquirer, the provider (operator) of the payment interchange network 725, and the Issuer 110. Another party may provide the payment exchange network 725, or one of the other parties, such as the Issuer 110 or Acquirer 130.

More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the financial transaction is settled among the Merchant 140, the Acquirer 130 and the Issuer 110. Settlement refers to the transfer of financial data or funds related to the transaction. Typically, a transaction is settled first between the Issuer 110 and the provider of the payment interchange network 725, and then between the interchange network 725 provider and the Acquirer 130, and then between the Acquirer 130 and the Merchant 140.

The payment interchange network 725 may be a wholly or partially dedicated network, although increasingly it is distributed on-line, allowing virtual access from all over the world. The increase in the on-line interactions through the payment interchange network 725 and the large number of personal mobile device 125, 145 with security that can be easily compromised, has made fraud more likely.

In addition, the question of liability with so many unregulated devices 125, 145 is conventionally resolved by providing rules for every scenario. However, these rules are based on the parties providing, operating and maintaining their systems and protocols according to the agreed standards of the interchange network 725. This may mean that in the case of fraud, a vulnerability in the system of one of the parties is not detected because the issue is resolved by the compensation rules. Consequently, subsequent financial transactions may continue to exploit the same vulnerability.

In any case, the Card Scheme always has a vested interest in minimizing fraud events to prevent reputational damage, and if a sizeable breach that threatened a member bank was to occur, then the Card Scheme may be liable under the Inter-member Settlement guarantee provided as part of the rules and protocols for the interchange network 725. In addition, a delayed detection of fraud may also damage the reputation of the other parties, such as the Issuer 110, the Merchant 130 and/or the Acquirer 130.

The invention is based upon several insights, including the insight that in some cases fraud may be preventable by improving the monitoring of approved (or authorized) financial transactions. Traditional efforts have concentrated on detecting anomalies during the approval of a particular transaction—approval is then dependent on the severity of the anomalies. In addition, blacklists are also used to exclude one or more parties from participating in a financial transaction and/or limits (usually in the amount) are applied when certain parties are involved or under certain circumstances.

By logging more details about approved financial transactions, more cases of fraud may be detected than with these traditional techniques. In addition, settlement of disputes may be easier—for example, there may be situations where the party authorizing (or approving) the transaction may not be strictly implementing the agreed security programs. In some cases, a party, such as an Issuer, an Acquirer or a Merchant, may have not implemented the security systems and protocols correctly, there may be a malfunction in the operation of the systems, the security may be compromised by a hack, or the party may decide not to perform all the agreed checks on the attributes associated with the financial transaction. The inventors have realized that a monitoring directed at approved financial transactions may therefore be very advantageous.

Figure 2:
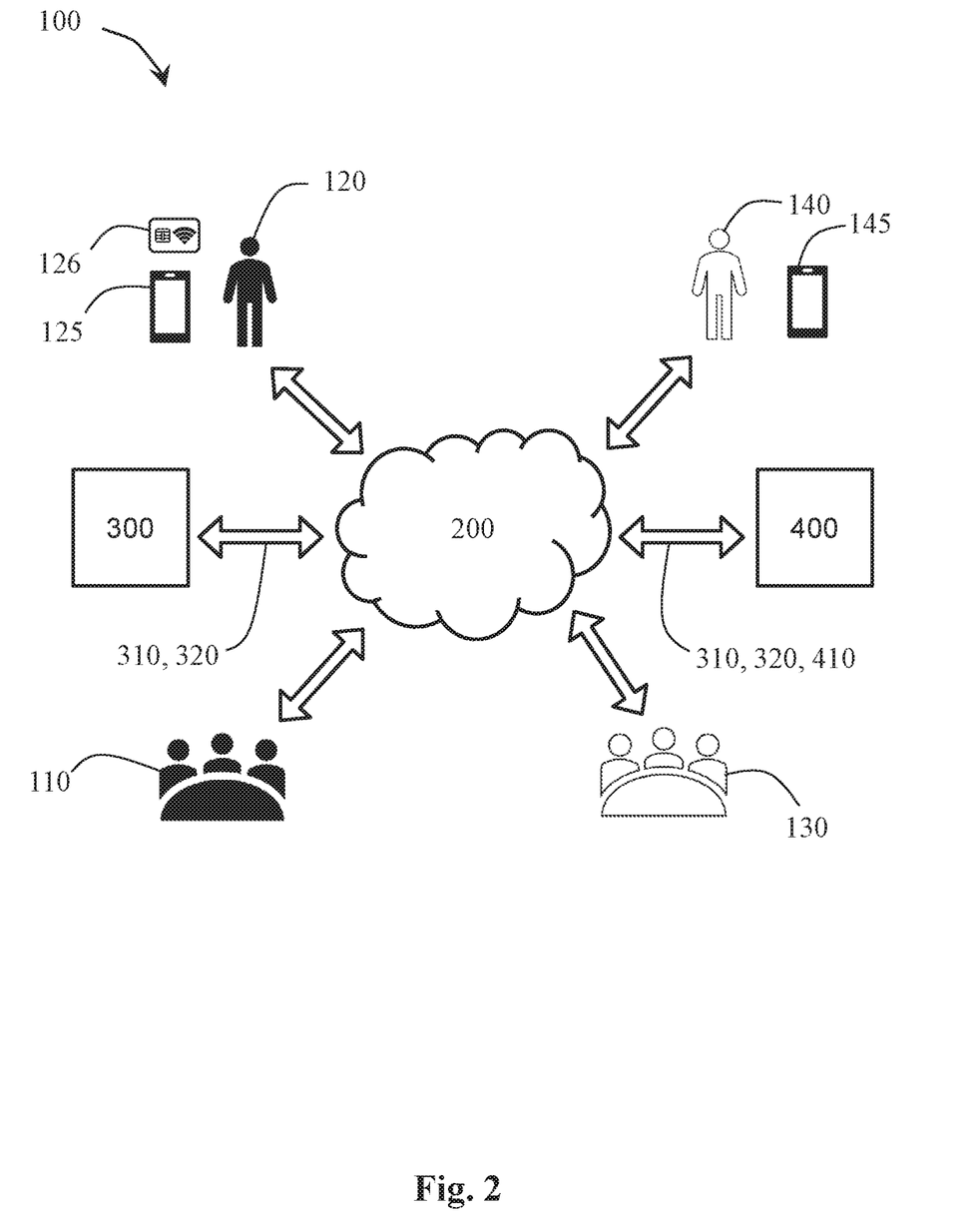
FIG. 2 shows an improved payment interchange network, which provides improved anomaly detection.

FIG. 2 depicts an improved payment interchange network 200, which allows an improved method for anomaly detection 100 to be performed. The network 200 and method 100 depicted in FIG. 2 are the same as those depicted in FIG. 1 except for the provision of an approval log 300 and an anomaly detector 400.

As mentioned above, electronic messages are preferably at least partially standardized to allow for a high degree of interconnectability, allowing parties from different global locations to be associated with the improved payment interchange network 200. ISO 8583 is used as a non-limiting example to illustrate one possible way in which the messages may be at least partially standardized to implement the embodiments of the invention. Any other standardization scheme agreed by the parties may also be used.

ISO 8583 messages use a bit map, whereby Data Elements (or DE's) are used to exchange information between parties, These Data Elements are assigned a position indicator in a control field, or bit map. A one in the assigned position indicates the presence of a Data Element in a specific message. A zero in the assigned position indicates the absence of a Data Element in a specific message.

ISO 8583 currently has three different versions—ISO 8583:1987, ISO 8583:1993 and ISO 8583:2003. The message formats are defined such that the first element indicates the ISO 8583 version in which the message has been encoded, allowing messages from different versions to be used in the same payment interchange network 200. Similarly, messages encoded using other standards may also be interchanged through the network 200.

ISO 8583—Part 1 (1987 edition), used here as a non-limiting example, is still widely used, and defines a set of available Data Elements that may be carried in compliant financial messages. These include:

| Bit | Name |
|---|---|
| 02 | Primary account number (PAN) |
| 03 | Processing code |
| 04 | Amount, transaction |
| 07 | Transmission date and time |
| 14 | Date, expiration |
| 18 | Merchant type, or merchant category code |
| 19 | Acquiring institution country code |
| 20 | PAN country code |
| 32 | Acquiring institution identification code (or Acquirer identification) |
| 34 | PAN, extended |
| 38 | Authorization identification response |
| 39 | Response code, such as: 00 Approved or completed successfully: approve 01 Refer to card issuer: call issuer 03 Invalid merchant: decline 04 Capture card: capture 05 Do not honor: decline 08 Honor with ID: approve 10 Partial approval: approve 12 Invalid transaction: decline 13 Invalid amount: decline 14 Invalid card number (PAN): decline |
| 41 | Card acceptor terminal identification (such as a Merchant terminal identification) |
| 42 | Card acceptor identification code (such as a Merchant identification) |
| 43 | Card acceptor (such as a Merchant) name/location, such as card acceptor street address / city / state / country |
| 44 | Additional response data |
| 52 | Personal identification number data |
| 53 | Security related control information |
| 64 | Message authentication code (MAC) |
| 96 | Message security code |

ISO 8583-Part 1 (2003 edition) is more recent, but currently less widely used. It is used here as a further non-limiting example. It defines a set of available Data Elements, which may be the same, modified or new compared to one of the earlier versions of the standard. These include:

| Bit | Name |
|---|---|
| 02 | Primary account number (PAN) |
| 03 | Processing code |
| 04 | Amount transaction |
| 07 | Date and time transmission |
| 14 | Date expiration (or Expiration date) |
| 19 | Country code acquiring institution |
| 20 | Country code primary account number (PAN) |
| 26 | Merchant category code |
| 31 | Acquirer reference number |
| 32 | Acquiring institution identification code (or Acquirer identification) |
| 38 | Approval code |
| 39 | Action code, such as: 0000 Approved 0001 Honour with identification 0002 Approved for partial amount 0003 Approved (VIP) 0004 Approved, update track 3 0005 Approved, account type specified by card issuer 0006 Approved for partial amount, account type specified by card issuer 0008 Approved but fees disputed 0009 Approved with overdraft 0010 Approved, customer reactivated 0011 Approved, terminal unable to process online 0012 Approved, transaction processed offline by terminal 0013 Approved, transaction processed offline after referral |
| 41 | Card acceptor terminal identification (such as a Merchant terminal identification) |
| 42 | Card acceptor identification code (such as a Merchant identification) |
| 43 | Card acceptor (such as a Merchant) name/location, such as card acceptor address / postal code / telephone number/ country code/e-mail address |
| 44 | Additional response data, such as card issuer telephone number |
| 49 | Verification data, such as card verification data, Cardholder billing address/postal code, Address verification result code |
| 53 | Security related control information |

-continued

| Bit | Name |
|---|---|
| 58 | Authorizing agent institution identification code |
| 95 | Card issuer reference data |

A computer-implemented approval log 300 is provided in communication with the improved payment interchange network 200. This log 300 is configured and arranged to receive transaction data 310, 320 from the payment interchange network 200, including primary account numbers (PAN's) 310 and transaction attributes 320 associated with the primary account number 310.

In particular, the log 300 is configured and arranged to receive one or more transaction attributes 320 from a plurality of approved financial transactions, storing the transaction attributes 320 as approval events associated with the primary account number 310. In other words, the approval log 300 is configured to monitor approved financial transactions which are initiated, approved and completed through the improved payment interchange network 200. The one or more attributes 320 are stored as approval events in the log 300, forming a history of attributes associated with approved financial transactions. As will be explained below, the attributes are stored in a database such that they remain associated with the PAN 310.

In general, a plurality of attributes relevant for each financial transaction are communicated through the interchange network 200 using interchange messages. At least a portion of these interchange messages comprise a plurality of attributes and further comprise the relevant PAN 310—in other words, these attributes are associated with the relevant PAN 310.

The interchange network 200 is configured and arranged to select one or more transaction attributes 320 from the interchange messages, and to provide them to the approval log 300 for storage. This monitoring function may be provided by a computer-implemented network monitor (not depicted), implemented in a computer system attached to the interchange network 200, implemented in the approval log 300, or any combination thereof. Selection of the one or more attributes to be stored in the approval log 300 may be performed by the approval log 300 and/or or in combination with network monitor.

The network monitor is configured and arranged to detect interchange messages associated with approved financial transactions—these may be detected by checking messages sent from the approver to the Point of Service (POS), which is the card acceptor location (usually determined by the Merchant 140) where the Cardholder (Consumer 120) agrees the transaction takes place. In most conventional systems, the Issuer 110 approves the financial transaction—however, the skilled person will realise that the network monitor may be configured and arranged to monitor approval by any party, such as the Acquirer 130 or the Merchant 140. Approval by more than one party may also be monitored.

For example, if at least a portion of the interchange messages comply with an ISO 8583 standard, the value of Data Element (DE) 39 may be used to detect an approved (or authorized) transaction—code 0000=Approved or completed successfully.

The messages which may be monitored, for example from ISO 8583:2003, include:
in an Authorization request response (MTI 110) from the Issuer 110 to the Acquirer 130

In an Authorization advice (MTI 120) from the Acquirer 130 to the Issuer 110 to advise of an approval carried out on behalf of the Issuer 110.

In an Authorization notification (MTI 140) from the Acquirer 130 to the Issuer 110 to notify of an authorization action Similar message types are available in interchange messages complying with other standards and protocols, such ISO 8583:1987 and ISO 8583:1993.

Optionally, one or more forms of partial and/or conditional approval may also be detected, for example from ISO 8583:2003:
0001 Honour with identification
0002 Approved for partial amount
0003 Approved (VIP)
0004 Approved, update track 3
0005 Approved, account type specified by card issuer
0006 Approved for partial amount, account type specified by card issuer
0008 Approved but fees disputed
0009 Approved with overdraft
0010 Approved, customer reactivated
0011 Approved, terminal unable to process online
0012 Approved, transaction processed offline by terminal
0013 Approved, transaction processed offline after referral Similar codes are available in interchange messages complying with other standards and protocols, such ISO 8583:1987 and ISO 8583:1993.

The approval log 300 is configured to receive and to store interchange messages, either wholly or partially, which indicate that a financial transaction has been at least partially approved. Additionally or alternatively, the network 200 may be configured and arranged such that the party who approves the financial transaction sends the appropriate data directly to the approval log 300 for storage—for example, if an Issuer 110 approves (authorizes) the financial transaction, it may be agreed under the rules of the interchange network 200 that each Issuer 110 provides all at least partially approved transactions to the approval log 300. Alternatively or additionally, it may be agreed that each Issuer 110 provides, operates and maintains its own approval log 300.

A computer-implemented approval anomaly detector 400 is also provided, which is in communication with the approval log 300. The detector 400 is configured and arranged to retrieve a plurality of approval events for one or more stored transaction attributes 320 from the storage log 300. Additionally or alternatively, the detector 400 may be in communication with the interchange network 200, as depicted in FIG. 2.

The detector 400 is further configured and arranged to assess the plurality of approval events for the presence of one or more anomalies 410, and to provide the one or more anomalies 410 to one or more parties associated with the payment interchange network 200. The detector 400 comprises an assessment algorithm, configured and arranged such that anomalies which are expected to indicate a higher risk for fraud will be detected.

The detector 400 may be configured to find anomalies 410 and to only notify them to one or more parties—this is the least intrusive operating method, allowing vulnerabilities associated with the activities of one or more parties to be identified before a sizable security breach occurs. Using this information, one or more parties may inform the party concerned about the detected vulnerability so that appropriate action may be taken. In some cases, participation in the payment interchange network 200 may be restricted, suspended or even revoked, depending on the severity of the vulnerability. Additionally or alternatively, a higher degree of monitoring and logging may be implemented for further financial transactions in which the party with the vulnerability plays an active role. A highly intrusive operating method, in which a financial transaction may be interrupted due to a high risk of fraud is described below.

Figure 3:
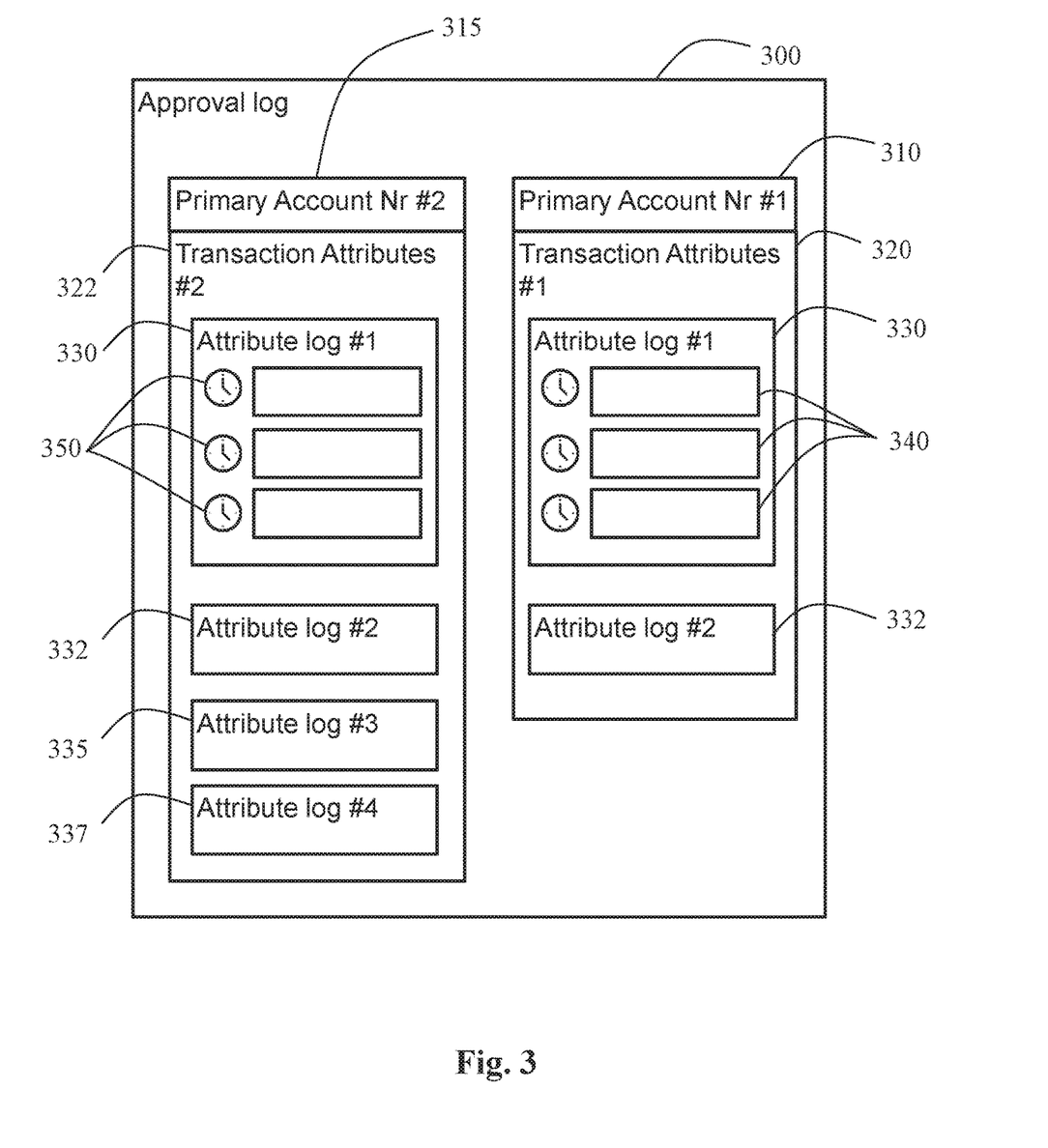
FIG. 3 shows schematically an example of how data may be stored in an approval log.

The approval log 300 may also be provided as a computer-implemented database, and FIG. 3 depicts schematically an example of how data may be stored. In this example, attributes associated with two PAN's—number 1 (#1) 310 and number 2 (#2) 315 are depicted.

Approvals associated with PAN number #1-310—are being monitored. In particular, a set of transaction attributes number 1 (#1) 320 comprises two attribute logs—number 1 (#1) 330 and number 2 (#2) 332. For clarity, the details of attribute log #2—332—are not shown. Each attribute log #1, #2—330, 332—comprises a plurality of approval events 340. Optionally, each event may be accompanied by a date/time stamp 350, or simply stored sequentially. It is this approval history for the attributes 330, 332 that is used to detect anomalies for the associated PAN number #1—310. Any anomalies are thus used to indicate a risk for fraud.

Approvals associated with a different PAN number, namely number #2—315—are also being monitored. In particular, a set of transaction attributes number 2 (#2) 322 comprises four attribute logs—number 1 (#1) 330, number 2 (#2) 332, number 3 (#3) 335 and number 4 (#4) 337. For clarity, the details of attribute logs #2, #3, #4—332, 335, 337—are not shown. Each attribute log #1, #2, #3, #4—330, 332, 335, 337—comprises a plurality of approval events 340. Optionally, each event may be accompanied by a date/time stamp 350, or simply stored sequentially. It is this history for the attributes 330, 332, 335, 337 that is used to detect anomalies for the associated PAN number #2—315. Any anomalies are thus used to indicate a risk for fraud.

In the example depicted in FIG. 3, the same attributes #1, #2—330, 332—are being monitored and logged for both PAN number #1—310—and PAN number #2—315. The skilled person will realise that the choice of attributes being logged and monitored may be optimized depending on, for example, the type of payment interchange network 200, the type of financial transactions, the amount of resources available such as storage space and processing power, and the desired degree of sensitivity to fraud. It may be advantageous to monitor the same attributes for all PAN's 310, 315 as this simplifies the anomaly detector processing. However, on a network 200 with different PAN's 310, 315 from more than one Issuer 100, it may be advantageous to monitor and log different attributes for different PAN series.

The attributes may be Personally Identifiable Information (PII) or Payments Card Information (PCI). For security reasons, such attributes may optionally be encoded in some way—for example, 1-way hashed rather than stored as raw data. may be. The specific values are not required, only a way to distinguish between them.

There are, in general, three types of attribute which may be monitored and logged:

a) attributes more closely linked to the PAN number 310, 315 than to the transaction. These PAN-linked attributes are expected to be constant for more than one transaction using a particular PAN number 301, 315, for example:

card data, an expiration date, fixed card verification data, a CVC1 code, a fixed CVC2 code, a PAN geographic location, a PAN country code, Consumer data, Consumer account information, a Consumer geographic location, a Consumer partial address, a Consumer compressed address, a Consumer full address, a Consumer full zip (postal) code, a Consumer partial zip (postal) code, Consumer address verification data, an address verification result code, an Address Verification System (AVS) code, a Consumer full telephone number, a Consumer partial telephone number, a Consumer full email address, a Consumer partial email address, Issuer data, Issuer reference data, an Issuer geographic location, an Issuer partial address, an Issuer compressed address, an Issuer full address, an Issuer full zip (postal) code, an Issuer partial zip (postal) code, an Interbank Card Association (ICA) number, and any combination thereof.

Using these examples, the skilled person will be able to judge their suitability for use in a particular payment interchange network 200, and will be able to identify additional attributes that may also be considered PAN-linked. For each attribute, the acceptable degree of variation may be determined empirically, and/or it may be based on regulations associated with the payment interchange network 200. The attributes selected should preferably be constant for a plurality of transactions, more preferably for a multiplicity of transactions to more easily detect fraud.

b) attributes more closely linked to the transaction than to the PAN number 310, 315. These transaction-linked attributes are expected to be used for one transaction (or relatively few transactions) using a particular PAN number 310, 315, for example:

a transaction reference, a transaction amount, a transaction date, a transaction time, Merchant data, a Merchant identification, a Merchant terminal identification, a Merchant category code, a Merchant geographic location, a Merchant country code, a Merchant partial address, a Merchant compressed address, a Merchant full address, a Merchant full zip (postal) code, a Merchant partial zip (postal) code, a Merchant IP address, a Merchant full url, a Merchant partial url, purchase information, a Universal Cardholder Authentication Filed (UCAF) code, a cryptogram, dynamic card verification data, a dynamic CVC2 code, a CVC3 code, chip field validation data, EMV validation data, a Card Verification Method (CVM) code, a Terminal Verification Results (TVR) code, an Authorization Request Cryptogram (ARQC) code, an Authorization Response Cryptogram (ARPC) code, an Action code, a Response code, and any combination thereof.

Using these examples, the skilled person will be able to judge their suitability for use in a particular payment interchange network 200, and will be able to identify additional attributes that may also be considered transaction-linked. For each attribute, the acceptable degree of variation may be determined empirically, and/or it may be based on regulations associated with the payment interchange network 200. The attributes selected should preferably be constant for a few transactions, more preferably for only one transaction to more easily detect fraud.

c) other attributes which may be used to provide additional data to further improve the assessment of the risk of fraud. For example:

Acquirer data, an Acquirer geographic location, an Acquirer country code, an Acquirer identification, an Acquirer reference number, and any combination thereof.

So if PAN-linked attributes are assessed by the anomaly detector 400, possible anomalies would be based on unexpected variations, such as:

different values used in consecutive financial transactions. For example, if several different expiration dates or CVC1 codes have been approved, it may indicate that no (or too little) conventional validation of the attributes is taking place.

subsequent transactions initiated by a Consumer in geographic locations far apart—for example, now in the United States, thirty minutes earlier in Germany.

frequent changes in a major portion of the address of the Cardholder 120. Although an occasional change of address is to be expected, it should not be too frequent.

frequent changes in a telephone number of the Cardholder 120. Although an occasional change of address is to be expected, it should not be too frequent.

Additionally or alternatively, anomalies may also be detected by unexpected use of the same attribute during events associated with different PAN numbers 310, 315, such as:

a large number of PAN numbers 310, 315 using the same Cardholder 120 geographical and/or e-mail address and/or telephone number.

If transaction-linked attributes are assessed by the anomaly detector 400, possible anomalies may be:

use of the same UCAF code and/or cryptogram for more than one transaction using the same PAN number 310, 315.

use of the same dynamic card verification and/or CVC3 and/or dynamic CVC2 for more than one transaction using the same PAN number 310, 315.

After detection of an anomaly 410, it may be provided to one or more parties associated with the payment interchange network 200. This is particularly advantageous if each party has its own algorithm for assessing a risk of fraud, or for collecting empirical data to be used in future revisions of the anomaly detection algorithms running on the anomaly detector 400 processor. In the case of payment-specific system fraud algorithms, one or more of the parties may provide the information to one or more of the other parties.

It may be advantageous to perform the assessment of the plurality of approval events for the presence of one or more anomalies 410 immediately before approval of a further financial transaction. For example, the payment interchange network 200 may be configured to always require an anomaly check 400 before a financial transaction is approved. Alternatively, the network 200 may be configured to require the check for financial transactions that have already been determined as having a higher degree of fraud susceptibility, such as transactions above a certain floor amount, transactions initiated online from certain geographic locations, or transactions associated with a certain PAN number 310, 315 range.

Additionally or alternatively, the anomaly detector 400 may be further configured to:

assess a risk of fraud during a further financial transaction associated with the primary account number 310, 315 based on the presence of one or more anomalies 410; and provide the risk of fraud to one or more parties associated with the payment interchange network 200.

It may be also advantageous to perform the assessment of the risk of fraud immediately before approval of a further financial transaction, based on similar considerations to those explained above for checking for anomalies immediately before a further financial transaction.

The PAN-number 310, 315 and/or one or more transaction attributes 320 to be monitored and logged may be provided by one or more of the following: the Issuer 110, the Merchant 140, the Acquirer 130, the Consumer 120, the network provider 200.

In many cases, approval (authorization) is provided by the Issuer 110. It may therefore be advantageous to closely link the configuration and operation of the approval log 300 and/or the approval anomaly detector 400 to the activities of the Issuer 110. For example, the attributes 320 logged for the plurality of financial transactions may be mainly those which can be provided by the Issuer 110. In some cases, the attributes 320 may be restricted only to those which can be provided by the Issuer 110. Alternatively, or additionally, the PAN-number 310, 315 may be provided by the Issuer 110.

The skilled person will realise that the network 200 may be further configured and arranged to comprise a plurality of approval logs 300 and/or a plurality of approval anomaly detectors 400. These may be configured:

identically, providing a backup arrangement similarly, providing a different anomaly assessment differently, providing different approaches to fraud assessment For example:

for an interchange network 200 comprising more than one Issuer 110, the Issuers 110 may configure and operate their own approval logs 300 and approval anomaly detectors 400, sharing the information only with other Issuers 110.

similarly, for an interchange network 200 comprising more than party of a particular type (Acquirers 130, Merchants 140, Consumers 120, network providers 200), the groups of those types of parties (Acquirers 130, Merchants 140, Consumers 120, network providers 200) may configure and operate their own approval logs 300 and approval anomaly detectors 400, sharing the information only with the same type of parties. Additionally or alternatively, they may share the information with a different type of party.

Although one or more parties associated with the payment interchange network 200 may store its own log for certain attributes, a centralised approval log 300 and/or centralised anomaly detector 400 is preferred to increase consistency. Read/write access may be regulated by the provider of the network 200 and/or one or more of the parties.

The additional possibilities to monitor and log approved financial transactions as provided in this disclosure may further enhance existing fraud detection systems and methods. The approval log 300 and/or anomaly detector 400 may be integrated into other payment exchange networks, such as being comprised in the Fraud Processing Hub 34 described in US application US 2015/0026070A1. The log 300 and/or detector 400 may be implemented in software on the existing computer server hardware, implemented using appropriately configured hardware, or some combination thereof.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

REFERENCE NUMBERS USED IN THE DRAWINGS

100 Improved method for anomaly detection in financial transactions
110 Issuer (e,g, a bank)
120 Consumer or Purchaser or Cardholder 125 Consumer mobile device
126 Payment card
130 Acquirer
140 Merchant or Retailer
145 Merchant mobile device
200 Improved payment interchange network
300 Approval log
310 Primary account number #1
315 Primary account number #2
320 Transaction attributes #1
322 Transaction attributes #2
330 Attribute log #1
332 Attribute log #2
335 Attribute log #3
337 Attribute log #4
340 Event
350 Date/time stamp
400 Approval anomaly detector
410 Anomaly
700 Conventional method for performing financial transactions
725 Conventional payment interchange network

What is claimed is:

1. A computer-implemented method for anomaly detection in financial transactions performed over a payment interchange network associated with one or more parties, the method comprising:
providing a first computer-implemented approval log in communication with the payment interchange network, the first approval log configured to:
receive first party interchange messages solely from a first party via the payment interchange network, wherein the first party interchange messages comprise encoded first party transactional information, the first party transactional information including a first primary account number and a first set of transaction attributes from a plurality of approved financial transactions associated with the first primary account number;
select one or more of the first set of transaction attributes from the first party interchange messages; and
store the selected one or more of the first set of transaction attributes as a plurality of approval events associated with the first primary account number;
providing a second computer-implemented approval log in communication with the payment interchange network, the second approval log configured to:
receive second party interchange messages solely from a second party via the payment interchange network, wherein the second party interchange messages comprise encoded second party transactional information, the second party transactional information including one of the first primary account number or a second primary account number and a second set of transaction attributes from a plurality of approved financial transactions associated with the first primary account number or the second primary account number;
select one or more of the second set of transaction attributes from the second party interchange messages; and
store the selected one or more of the second set of transaction attributes as a plurality of approval events associated with the first primary account number or the second primary account number; and
providing a computer-implemented approval anomaly detector in communication with the payment interchange network, the approval anomaly detector configured to:
retrieve from each of the first approval log and the second approval log, via the payment interchange network, a plurality of approval events for one or more stored transaction attributes;
assess the plurality of approval events for the presence of one or more anomalies;
provide the one or more anomalies to one or more parties associated with the payment interchange network; and
based on a severity of vulnerability presented by the one or more anomalies, one or more of:
restrict, suspend or revoke participation by a party in the payment interchange network;
increase a requirement for the party to monitor and log transactional information; or
require a fraud risk assessment to be conducted for transactions immediately prior to approval by the party.

2. The computer-implemented method according to claim 1, the method further comprising:
assessing a risk of fraud during a further financial transaction associated with the primary account number based on the presence of one or more anomalies; and
providing the risk of fraud to one or more parties associated with the payment interchange network.

3. The computer-implemented method according to claim 2, wherein:
assessing the risk of fraud is performed immediately before approval of the further financial transaction.

4. The computer-implemented method according to claim 1, wherein:
assessing the plurality of approval events for the presence of one or more anomalies is performed immediately before approval of a further financial transaction.

5. The computer-implemented method according to claim 1, wherein:
the one or more parties comprises one or more of the following:
an Issuer, a Merchant, an Acquirer, a Consumer, a network provider; and
the first party is one of the following:
the Issuer, the Merchant, the Acquirer, or the network provider.

6. The computer-implemented method according to claim 1, wherein:
the one or more parties comprises one or more Issuers or one or more Merchants who approve the plurality of financial transactions.

7. The computer-implemented method according to claim 1, wherein:
the one or more parties comprises one or more of the following:
an Issuer, a Merchant, an Acquirer, a Consumer, a network provider; and
the one or more anomalies are provided to the one or more of the following:
the Issuer, the Merchant, the Acquirer, the Consumer, the network provider.

8. The computer-implemented method according to claim 1, wherein the one or more transaction attributes from a plurality of approved financial transactions associated with the first primary account number comprise an attribute more closely linked to the first primary account number than to the plurality of approved financial transactions.

9. The computer-implemented method according to claim 8, wherein the one or more transaction attributes comprises one or more of:
card data, an expiration date, fixed card verification data, a CVC1 code, a fixed CVC2 code, a PAN geographic location, a PAN country code, Consumer data, Consumer account information, a Consumer geographic location, a Consumer partial address, a Consumer compressed address, a Consumer full address, a Consumer full zip (postal) code, a Consumer partial zip (postal) code, Consumer address verification data, an address verification result code, an Address Verification System (AVS) code, a Consumer full telephone number, a Consumer partial telephone number, a Consumer full email address, a Consumer partial email address, Issuer data, Issuer reference data, an Issuer geographic location, an Issuer partial address, an Issuer compressed address, an Issuer full address, an Issuer full zip (postal) code, an Issuer partial zip (postal) code, or an Interbank Card Association (ICA) number.

10. The computer-implemented method according to claim 1, wherein the one or more transaction attributes from a plurality of approved financial transactions associated with the first primary account number comprise an attribute more closely linked to the plurality of approved financial transactions than to the first primary account number.

11. The computer-implemented method according to claim 10, wherein the one or more transaction attributes comprises one or more of:
a transaction reference, a transaction amount, a transaction date, a transaction time, Merchant data, a Merchant identification, a Merchant terminal identification, a Merchant category code, a Merchant geographic location, a Merchant country code, a Merchant partial address, a Merchant compressed address, a Merchant full address, a Merchant full zip (postal) code, a Merchant partial zip (postal) code, a Merchant IP address, a Merchant full url, a Merchant partial url, purchase information, a Universal Cardholder Authentication Filed (UCAF) code, a cryptogram, dynamic card verification data, a dynamic CVC2 code, a CVC3 code, chip field validation data, EMV validation data, a Card Verification Method (CVM) code, a Terminal Verification Results (TVR) code, an Authorization Request Cryptogram (ARQC) code, an Authorization Response Cryptogram (ARPC) code, an Action code, or a Response code.

12. The computer-implemented method according to claim 1, wherein the one or more transaction attributes from a plurality of approved financial transactions associated with the first primary account number comprises one or more of:
Acquirer data, an Acquirer geographic location, an Acquirer country code, an Acquirer identification, or an Acquirer reference number.

13. The computer-implemented method according to claim 1, the method further comprising:
providing a further computer-implemented approval anomaly detector in communication with the payment interchange network.

14. The computer-implemented method according to claim 1, wherein to receive from the first party via the payment interchange network the one or more transaction attributes from a plurality of approved financial transactions comprises:
receiving one or more interchange messages associated with each approved financial transaction; and
selecting the one or more transaction attributes from the one or more interchange messages.

15. The computer-implemented method according to claim 14, wherein at least a portion of the interchange messages comply with one or more of:
an ISO 8583 standard, an EMV standard or protocol, or a 3D Secure (3DS) standard or protocol.

16. A computer-based anomaly detection system, comprising:
a first computer-implemented approval log to communicate with a payment interchange network, the first approval log configured to:
receive first party interchange messages solely from a first party via the payment interchange network, wherein the first party interchange messages comprise encoded first party transactional information, the first party transactional information including a first primary account number and a first set of transaction attributes from a plurality of approved financial transactions associated with the first primary account number;
select one or more of the first set of transaction attributes from the first party interchange messages; and
store the selected one or more of the first set of transaction attributes as a plurality of approval events associated with the first primary account number;
a second computer-implemented approval log to communicate with the payment interchange network, the second approval log configured to:
receive second party interchange messages solely from a second party via the payment interchange network, wherein the second party interchange messages comprise encoded second party transactional information, the second party transactional information including one of the first primary account number or a second primary account number and a second set of transaction attributes from a plurality of approved financial transactions associated with the first primary account number or the second primary account number;
select one or more of the second set of transaction attributes from the second party interchange messages; and
store the selected one or more of the second set of transaction attributes as a plurality of approval events associated with the first primary account number or the second primary account number; and
a computer-implemented approval anomaly detector to communicate with the payment interchange network, the approval anomaly detector configured to:
retrieve from each of the first approval log and the second approval log, via the payment interchange network, a plurality of approval events for one or more stored transaction attributes;
assess the plurality of approval events for the presence of one or more anomalies;
provide the one or more anomalies to one or more parties associated with the payment interchange network; and
based on a severity of vulnerability presented by the one or more anomalies, one or more of:
restrict, suspend or revoke participation by a party in the payment interchange network;

increase a requirement for the party to monitor and log transactional information; or require a fraud risk assessment to be conducted for transactions immediately prior to approval by the party.

17. The system according to claim 16, wherein the one or more transaction attributes from a plurality of approved financial transactions associated with the first primary account number comprise an attribute more closely linked to the first primary account number than to the plurality of approved financial transactions.

18. The system according to claim 16, wherein the one or more transaction attributes from a plurality of approved financial transactions associated with the first primary account number comprise an attribute more closely linked to the plurality of approved financial transactions than to the first primary account number.

19. The system according to claim 16, wherein to receive from the first party via the payment interchange network the one or more transaction attributes from a plurality of approved financial transactions comprises:

receiving one or more interchange messages associated with each approved financial transaction; and selecting the one or more transaction attributes from the one or more interchange messages.

20. The system according to claim 19, wherein at least a portion of the interchange messages comply with one or more of:

an ISO 8583 standard, an EMV standard or protocol, or a 3D Secure (3DS) standard or protocol.

* * * * *